United States Patent [19]

Kitahara et al.

[11] Patent Number: 4,636,038
[45] Date of Patent: Jan. 13, 1987

[54] ELECTRIC CIRCUIT MEMBER AND LIQUID CRYSTAL DISPLAY DEVICE USING SAID MEMBER

[75] Inventors: Nobuko Kitahara, Tama; Osamu Takamatsu, Yokohama; Tetsuya Kaneko, Tokyo; Masao Sugata, Yokohama, all of Japan

[73] Assignee: Canon Kabushiki Kaisha, Tokyo, Japan

[21] Appl. No.: 628,276

[22] Filed: Jul. 6, 1984

[30] Foreign Application Priority Data

Jul. 9, 1983 [JP] Japan .................. 58-124084
Jul. 12, 1983 [JP] Japan .................. 58-126742

[51] Int. Cl.⁴ .................................. G02F 1/13
[52] U.S. Cl. .................. 350/339 R; 350/341
[58] Field of Search ............... 350/339 R, 341

[56] References Cited

U.S. PATENT DOCUMENTS 4,252,414  2/1981  Kinugawa et al. ............ 350/339 R
4,448,491  5/1984  Okubo ...................... 350/339 R X
4,568,149  2/1986  Sugata et al. .............. 350/339 R X

FOREIGN PATENT DOCUMENTS 58-62622  4/1983  Japan ..................... 350/339 R Primary Examiner—John K. Corbin
Assistant Examiner—Richard F. Gallivan
Attorney, Agent, or Firm—Fitzpatrick, Cella, Harper & Scinto

[57] ABSTRACT

An electric circuit member comprises a substrate provided with a thin film transistor array thereon, an inorganic insulating layer formed over said thin film transistor array and an organic insulating layer formed over said inorganic insulating layer.

30 Claims, 4 Drawing Figures

ELECTRIC CIRCUIT MEMBER AND LIQUID CRYSTAL DISPLAY DEVICE USING SAID MEMBER

BACKGROUND OF THE INVENTION

1. Field of the Invention

This invention relates to an electric circuit member having a thin film transistor (TFT) array and a liquid crystal display device using said electric circuit member, and more particularly to a liquid crystal display device havinga thin film transistor (TFT) array to effect switching at every picture element.

2. Description of the Prior Art

Heretofore, electric circuit members have been widely used in display devices and others. Exemplary of such devices is a liquid crystal display device. Generally, liquid crystal display devices have a structure comprising liquid crystal interposed with two substrates. On the side confronting the liquid crystal of the substrate, there are formed elements such as electrodes and others. Display is effected by controlling the state of the liquid crystal with the aid of these elements. On the surface of one substrate, an electrode is formed uniformly. On the surface of the other substrate, there are formed plural electrodes of a small block pattern (picture element) having an appropriate shape.

In recent years, there has been adopted a technique that TFT array to effect switching at every picture element is disposed on the surface of the substrate equipped with the picture element electrodes. FIG. 1 is a schematic sectional view of such a liquid crystal display device having TFT array. In FIG. 1, S and S' designate transparent substrates made of glass, etc. and 1 and 1' denote gate electrodes. 2 and 2' designate insulating layers, and 3 and 3' denote semiconductor layers. 4 and 4' designate source electrodes, and 5 and 5' denote drain electrodes. 6 is an insulating and orienting layer, and 7 is liquid crystal. 8 is a transparent electrode.

In the case where a photoconductive material is to be used for the transistor, it is desired to prevent the transistor from being irradiated with light to the utmost in order to stabilize the switching characteristics. For this purpose, there may be employed the liquid crystal display device as shown in the schematic sectional view of FIG. 2. In this device, shading layers 9 and 9' are further provided at the positions corresponding to the semiconductor layers 3 and 3' on the insulating and orienting layer 6 covering TFT in the device as shown in FIG. 1. For the shading layer, metal is generally employed.

In the devices as described above, there have been used as the insulating layer inorganic materials, for example, metal oxides such as alumina, titanium oxide, etc., silicon compounds such as silicon nitride, silicon dioxide, etc. and the like up to now. In order to cover TFT, a certain film thickness is required. However, when the film thickness of these inorganic materials is increased, there is caused a problem that cracks are liable to be generated therein with film strain which increases as the film becomes thicker. If such cracks are generated, TFT is simultaneously destroyed. Therefore, TFT is not completely protected, which degrades the characteristics thereof. Accordingly, instead of using inorganic materials, there has been proposed using organic materials in which cracks are not generated, such as silicone resins, acrylic resins, cyclized polyisoprenes, and the like for the insulating layer. However, insulating layers made of these organic materials do not have sufficient properties as required for the protecting layer and there is a defect that the characteristics of TFT become unstable.

In the liquid crystal display device as described above, the insulating layer is subjected to orienting treatment and serves for an orienting layer, too. In the case where the shading layers are formed, the orienting treatment must be carried out thereafter. By this orienting treatment, the shading layer either undergoes no orientation or becomes an orientation state differing significantly from that of the insulating layer. Tehrefore, the orientation of the liquid crystal may be disordered in the vicinity of the insulating layers, which exerts a bad influence upon the display.

SUMMARY OF THE INVENTION

It is, therefore, an object of the present invention to provide an improved electric circuit member capable of insuring that the insulating layer of TFT shows satisfactory performance for a long time in view of the prior art as mentioned above.

Another object of the present invention is to provide an electric circuit member capable of satisfactorily preventing generation of pinholes and bad influences exerted upon the electric circuit membr and devices equipped therewith with the aid of an organic insulating layer even if cracks are generated as is the case with the inorganic insulating layers of the prior art.

Still another object of the present invention is to provide an improved liquid crystal display device capable of insuring that the insulating layer of TFT shows satisfactory performance for a long time and preventing the orientation of the liquid crystal from being disordered even in the vicinity of the shading layers.

Yet another object of the present invnetion is to provide a liquid crystal display device in which uniform orientation can be accomplished and which has uniform displaying characteristics advantageously over the whole surface.

Accordingly to one aspect of the present invnetion, there is provided an electric circuit member comprising a substrate provided with a thin film transistor array thereon, an inorganic insulating layer formed over said thin film transistor array and an organic insulating layer formed over said inorganic insulating layer.

According to another aspect of the present invention, there is provided a liquid crystal display device comprising a substrate provided with a thin film transistor array thereon, an inorganic insulating layer formed over said thin film transistor array, an organic insulating layer formed over said inorganic insulating layer and shading means for shading light to which said thin film transistor is sensitive, the surface part of said organic insulating layer in contact with liquid crystal has an orienting property.

According to still another aspect of the present invention, there is provided a liquid crystal display device comprising a substrate provided with a thin film transistor array thereon, an inorganic insulating layer formed over said thin film transistor array, an organic insulating layer formed over said inorganic insulating layer, shading means for shading light to which said thin film transistor is sensitive and an orienting layer formed over at least the surface portion of said organic insulating layer situated at the display region.

DESCRIPTION OF THE PREFERRED EMBODIMENT

Figure 1:
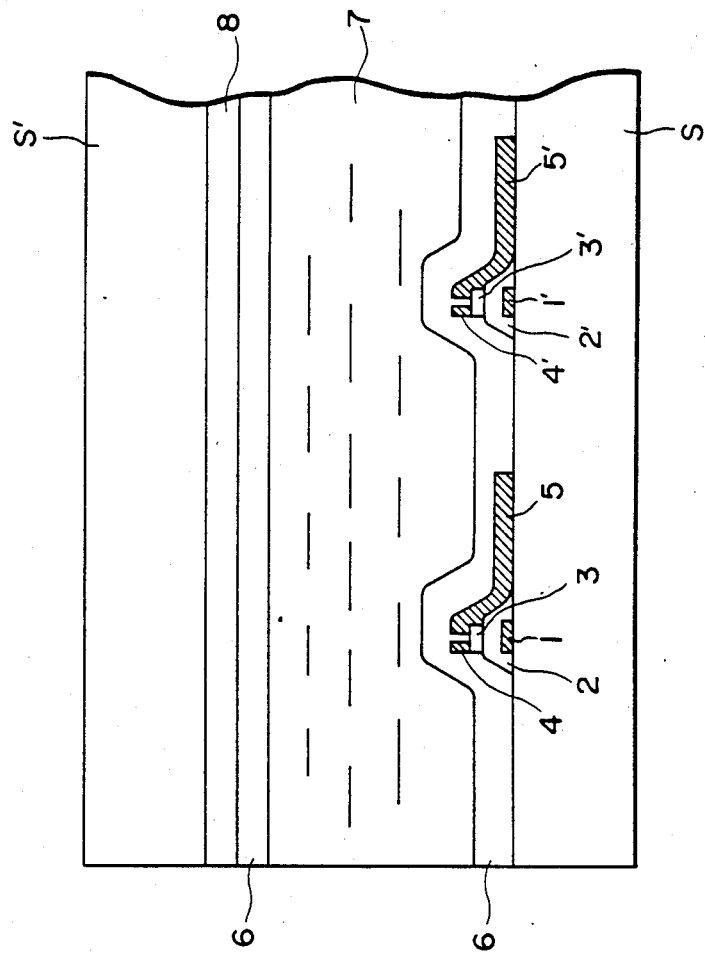
FIG. 1 and FIG. 2 are schematic sectional views of a liquid crystal display device of the prior art.
Figure 2:
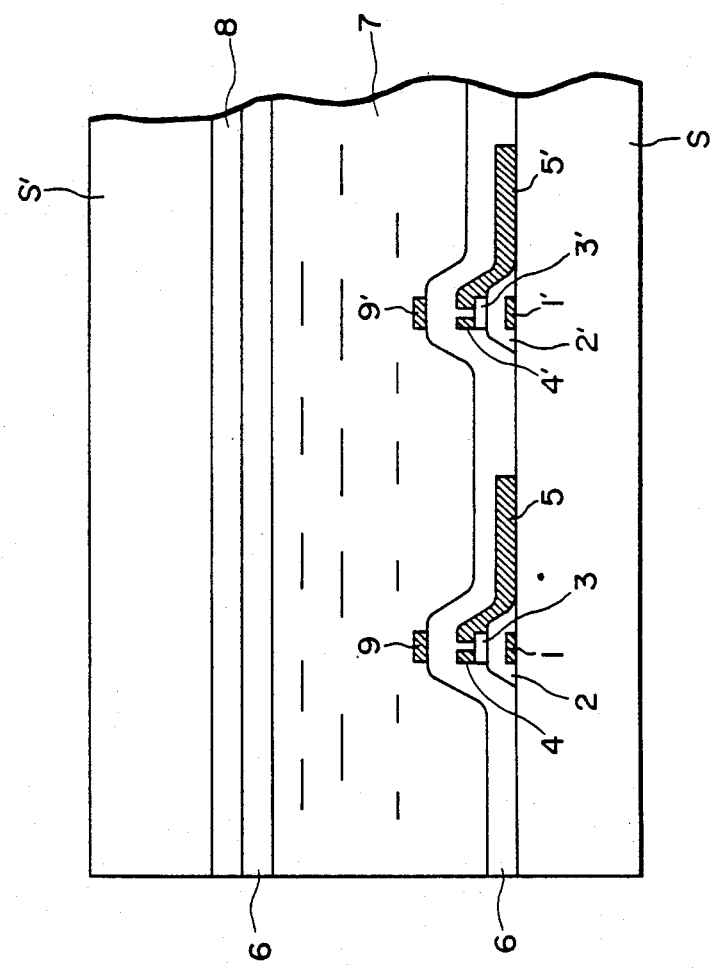
Figure 3:
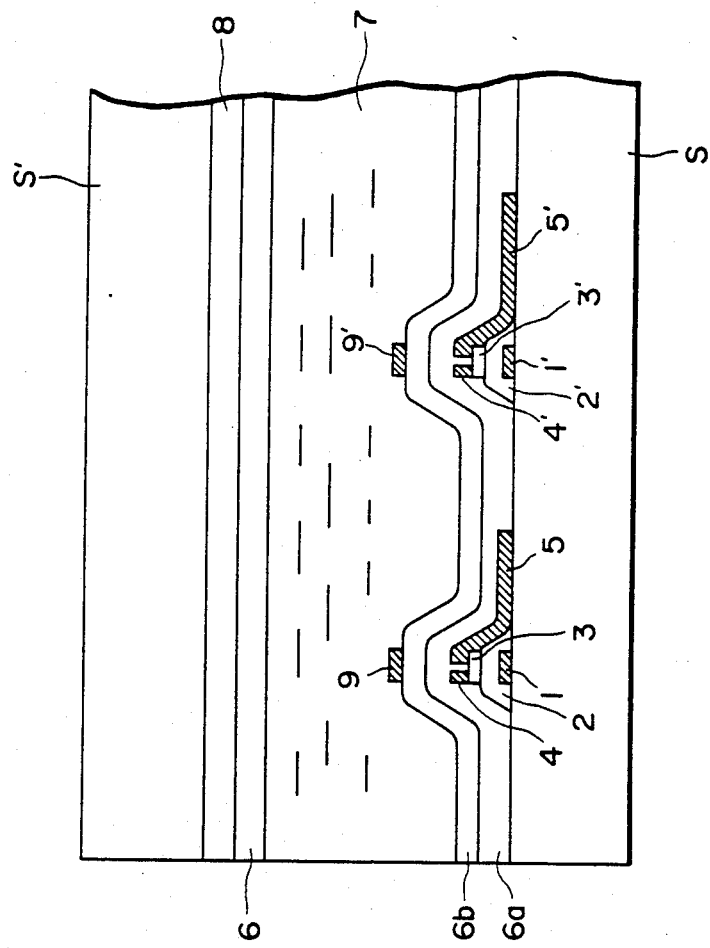
FIG. 3 and FIG. 4 are schematic sectional views of a liquid crystal display device in accordance with the invention.

FIG. 3 is a schematic sectional view illustrating a preferred embodiment of a liquid crystal display device employing an electric circuit member according to this invention. In FIG. 3, the electric circuit member is employed as a component of the liquid crystal display device.

As semiconductor layers 3 and 3' constituting TFT, there may be suitably employed, for example, Si, CdS, CdSe, CdTe, Te, etc., especially amorphous, polycrystalline or microcrystalline silicon. Amorphous silicon may contain hydrogen atoms and halogen atoms (especially fluorine atoms). Hydrogen atoms and halogen atoms may be contianed singly or in combination.

The total content of hydrogen atoms and halogen atoms contained in amorphous silicon may be preferably 0.01 to 40 atomic %, more preferably 0.01 to 30 atomic %.

In this embodiment, an insulating layer covering TFT array is composed of two layers (i.e., 6a and 6b).

6a designates an inorganic insulating layer and this layer can be formed by the use of inorganic materials, e.g., metal oxide such as titanium oxide, alumina, etc., silicon compounds such as silicon dioxide, silicon nitride, etc. and the like by vapor deposition method, sputtering method, chemical vapor deposition (CVD) method and the like.

The inorganic insulating layer need not necessarily be formed in contact with TFT. The inorganic insulating layer need not necessarily cover the whole surface of the substrate, but is desired to have a thickness such that it will protect at least the channel portion of TFT. The thickness may be preferably 500 to 3000 Å.

6b designates an organic insulating layer. As a material constituting the organic insulating layer, there may preferably be employed thermosetting resins, thermoplastic resins, synthetic rubber type resins and the like. However, there may be employed any material which, substantially, can perfectly be hardened and is transparent to visible rays at such a hardened state and can be subjected to orienting treatment. As the thermosettiing resin, there may be mentioned phenol resins, polyester resins, silicone resins, acrylic resins, urethane resins and the like. There may be added a crosslinking agent, a polymerization agent, a sensitizer, etc. to these theremosetting resins as occasion arises. As the theremoplastic resin, there may be mentioned polycarbonate, polyethylene, polystyrene and the like. There may also be added additives such as stabilizer, etc. to these thermoplastic resins. As the synthetic rubber rype resin, there may be mentioned cyclized polyisoprenes, cyclized polybutadienes and the like. There may be added a crosslinking agent, a sensitizer, etc. to these synthetic rubber type resins.

The organic insulating layer may be formed, for example, by dissolving a thermosetting resin or a synthetic rubber type resin in a solvent and applying the solution to the inorganic insulating layer as mentioned above, followed by crosslinking, polymerizing and hardening the resin utilizing application of heat and irradiation of electromagnetic wave such as ultraviolet rays, radiation, etc. singly or in combination. When a thermoplastic resin is used, the organic insulating layer may be formed, for example, by melting the resin by the application of heat and applying the melted resin to the inorganic insulating layer as mentioned above, followed by cooling and hardening it. The organic insulating layer need not necessarily be formed in contact with the inorganic insulating layer. The thickness of the organic insulating layer, although related to the thickness of the inorganic insulating layer, may be preferably 500 to 3000 Å. Since too big a total thickness of the inorganic insulating layer and the organic insulating layer may exert a bad influence upon display, it is desired to determine the layer thickness in a suitable range. In the case where amorphous silicon is to be employed for the semiconductor layer constituting TFT, heating temperature is desired to be below 300° C. This is because a temperature above 300° C. may exert a thermal influence upon the amorphous silicon layer to change or degrade the characteristics of TFT.

Over the organic insulating layer are formed shading layers to shade light to which the thin film transistor is sensitive. Shading layers 9 and 9' are formed, for example, by evaporating a metal such as Al, etc. onto the organic insulating layer, followed by shaping the metla layer into a desired shape and size by photolithoetching, or the like. Shading layers need not necessarily be formed in contact with the organic insulating layer. The organic insulating layer is then subjected to orienting treatment to give an orienting property to the side thereof which is in contact with the liquid crystal. Then, a liquid crystal display device is produced using this member by conventional processes.

Figure 4:
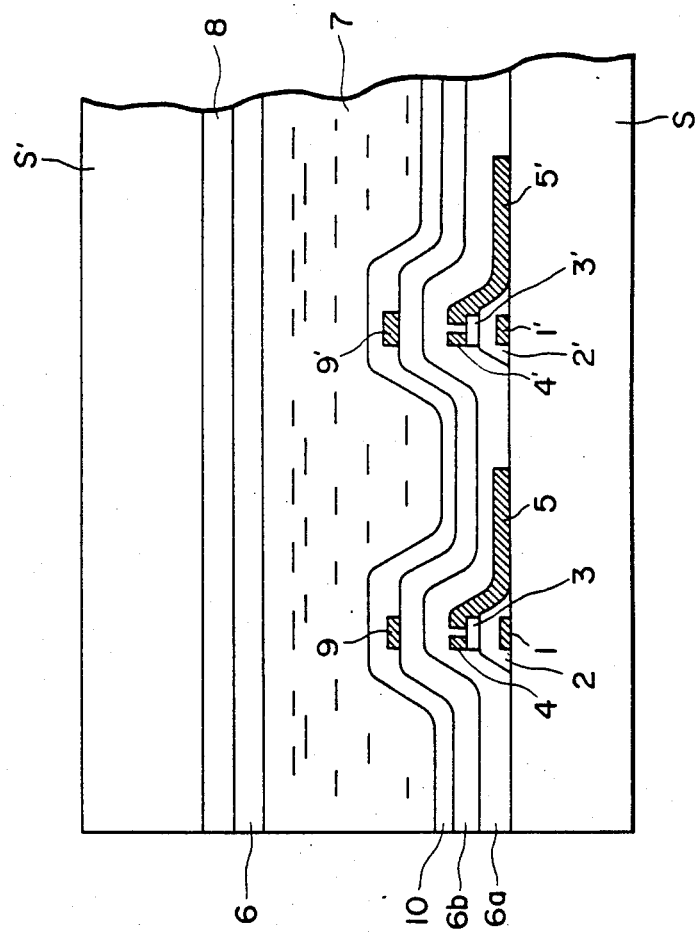

The liquid crystal display device of this invention as shown in the schematic sectional view of FIG. 4 is produced by forming shading layers 9 and 9' on the electric circuit member as shown in FIG. 3, followed by forming an orienting layer 10 in such a way that it will cover the organic insulating layer 6b and the shading layers 9 and 9'. As the material of the orienting layer 10, there may be used any materials which are commonly used in this type of devices. For example, an organic orienting layer may be formed by forming a poly-p-xylylene film by CVD method or by spinner coating polyvinyl alcohol, followed by polishing the surface thereof directly in a prescribed direction to effect orientation. An inorganic orienting layer may also be formed by effecting oblique vapor deposition of inorganic materials. In this case, there need not necessarily be employed a material capable of being subjected to orienting treatment for the material of the organic insulating layer 6b. The orienting layer need not necessarily be formed in contact with the organic insulating layer and the shading layers. Furthermore, the orienting layer need not necessarily cover the whole surface of the organic insulating layer but is desired to be formed over at least the surface portion of the organic insulating layer situated at the display region. The "display region" herein is a region where liquid crystal is oriented to effect display.

In the foregoing, an embodiment in which the electric circuit member of this invnetion is utilized as a component of the liquid crystal display device was illustrated. However, it is to be understood that electric circuit member of this invnetion may also be utilized as a component of other devices such as EL, EC, etc. and other kinds of devices.

According to the electric circuit member of this invnetion, by further forming the organic insulating layer over the inorganic insulating layer as described above, it has become feasible to sufficiently protect TFT and stabilize the characteristics thereof with the aid of the inorganic insulating layer and also to satisfactorily prevent a bad influence exerted upon the device and generation of pinholes with the aid of the organic insulating layer even if cracks are generated as is the case with inorganic insulating layers of the prior art. Furthermore, the electric circuit member of this invention has a stable performance for a long time.

According to this invention, as described above, by forming the organic insulating layer over the inorganic insulating layer, there is further provided the liquid crystal display device with a stable performance for a long time which is capable of sufficiently protecting TFT and stabilizing the characteristic thereof with the aid of the inorganic insulating layer and satisfactorily preventing a bad influence exerted thereupon and generation of pinholes with the aid of the organic insulating layer even if cracks are generated as is the case with inorganic insulating layers of the prior art. Furthermore, according to this invention, by forming the orienting layer uniformly in such a way that it will cover the whole surface of the orgnaic insulating layer and the shading layers as formed thereon and also applying orienting treatment uniformly to the whole surface of the organic insulating layer and the shading layers as formed thereon, there is not caused disorder of the liquid crystal in the vicinity of the shading layers and can be uniformly obtained excellent displaying characteristics over the whole surface. In addition, according to this invention, since the orienting layer covers the shading layers with its surface formed smoothly, uniform orienting treatment can readily be accomplished. By forming the orienting layer uniformly on the whole surface of the electric circuit member equipped with TFT which is uneven to level the surface thereof, it has also become feasible to reduce disorder phenomenon of the orientation caused by the ununiformity of the liquid crystal layer due to the unevenness of the surface of the electric circuit member.

The following examples are given for the purpose of illustration and not for the purpose of limiting the scope of the invention.

EXAMPLE 1

On the surface of a substrate on which TFT array had been formed, there was further formed a silicon nitride layer (2000 Å thick) by plasma CVD method. On this silicon nitride layer was then spinner-coated a cyclized polyisoprene type resist (trade name: ODUR-110WR, mfd. by Tokyo Ohka Kogyo Co., Ltd: 18 cp) at 3000 r.p.m., followed by curing it for 2 seconds by the use of a high pressure mercury lamp and further haking it at 150° C. for 20 minutes, thereby forming a colorless transparent organic insulating layer about 1 μm thick. On the electric circuit board thus produced was evaporated Al, followed by removing unnecessary portion thereof by etching to form shading layers. Then, orienting treatment was applied thereto, followed by employing conventional steps to produce a liquid crystal display device.

The liquid crystal display device thus obtained was operated continuously for 1000 hours under the conditions of high temparature and high humidity (90° C., 90% RH). As a result, the device showed excellent displaying characteristics all through the operation.

EXAMPLE 2

On the surface of a substrate on which TFT array had been formed, there was further formed a silicon dioxide layer (3000 Å thick) by sputtering method. The substrate was then dipped in 10% by weight solution of a urethane resin (tradename: DELPO MAX, mfd. by TOA PAINT Co., Ltd.) in toluene and drawn up at a rate of 100 mm/min, followed by drying it at 50° C. for 20 minutes. The substrate was then irradiated with a high pressure mercury lamp to cure the urethane resin. As a result was formed a colorless transparent organic insulating layer about 1.5 m thick. On the electric circuit board thus produced was evaporated Al, followed by removing unnecessary portion thereof by etching to form shading layers. Orienting treatment was then applied thereto, followed by employing conventional steps to produce a liquid crystal display device.

The liquid crystal display device thus obtained was evaluated in a manner similar to Example 1. The device showed excellent displaying characteristics similar to those obtained in Example 1.

EXAMPLE 3

On the surface of a substrate on which TFT array had been formed, there was further formed a silicon nitride layer (2000 Å thick) by plasma CVD method. On this silicon nitride layer was then spinner-coated a cyclized polyisoprene type resist (trade name: ODUR-110WR, mfd. by Tokyo Ohka Kogyo Co., Ltd: 18 cp) at 3000 r.p.m., followed by curing it for 2 seconds by the use of a high pressure mercury lamp and further baking it at 150° C. for 20 minutes, thereby forming a colorless transparent organic insulating layer about 1 μm thick. On the electric circuit board thus produced was evaporated Al, followed by removing unnecessary portion thereof by etching to form shading layers. Approximately 2000 Å of poly-P-xylylene were evaporated onto the organic insulating layer with the shading layers thereon by vacuum CVD method, followed by orienting treatment of its surface. By employing the thus obtained display member, a liquid crystal display device was prepared by way of conventional steps. The liquid crystal display device thus obtained was operated continuously for 1000 hours under the conditions of high temparature and high humidity (90° C., 90% RH). As a result, the device showed very excellent displaying characteristics all through the operation.

EXAMPLE 4

On the surface of a substrate on which TFT array had been formed, there was further formed a silicon nitride layer (2000 Å thick) by plasma CVD method. On this silicon nitride layer was then spinner-coated a cyclized polyisoprene type resist (trade name: ODUR-110WR, mfd. by Tokyo Ohka Kogyo Co., Ltd: 18 cp) at 3000 r.p.m., followed by curing it for 2 seconds by the use of a high pressure mercury lamp and further baking it at 150° C. for 20 minutes, thereby forming a colorless transparent organic insulating layer about 1 μm thick. On the electric circuit member thus produced was evaporated Al, followed by removing unnecessary portion thereof by etching to form shading layers. Onto the organic insulating layer with the shading layers thereon was then spinner-coated a 5% aqueous solution of polyvinyl alcohol at 3000 r.p.m., followed by curing and orienting treatment, resulting in an orienting layer about 2000 Å thick. By employing the thus obtained display member, a liquid crystal display device was prepared by way of conventional steps. The liquid crystal display device thus obtained was operated continuously for 1000 hours under the conditions of high temparature and high humidity (90° C., 90% RH). As a result, the device showed very excellent displaying characteristics all through the operation.

We claim:

1. An electric circuit member comprising a substrate provided with a thin film transistor array thereon, an inorganic insulating layer formed over said thin film transistor array and an organic insulating layer formed over said inorganic insulating layer.

2. An electric circuit member according to claim 1, wherein the semiconductor layer constituting said thin film transistor is made of a material selected from the group consisting of at least Si, CdS, CdSe, CdTe and Te.

3. An electric circuit member according to claim 1, wherein the semiconductor layer constituting said thin film transistor is made of an amorphous material.

4. An electric circuit member according to claim 1, wherein the semiconductor layer constituting said thin film transistor is made of a microcrystalline material.

5. An electric circuit member according to claim 1, wherein the semiconductor layer constituting said thin film transistor is made of a polycrystalline material.

6. An electric ciruit member according to claim 1, wherein the semiconcuctor layer constituting said thin film transistor is made of amorphous silicon and said amorphous silicon contains hydrogen atoms and/or halogen atoms.

7. An electric circuit member according to claim 1, wherein the semiconductor layer constituting said thin film transistor is made of amorphous silicon and said amorphous silicon contains hydrogen atoms and/or halogen atoms in a total amount of 0.01 to 40 atomic %.

8. An electric circuit member according to claim 1, wherein said organic insulating layer is formed using a material selected from the group consisting of a thermosetting resin, a thermoplastic resin and a synthetic rubber type resin.

9. An electric circuit member according to claim 1, wherein the thickness of said organic insulating layer is 500 to 3000 Å.

10. An electric circuit member according to claim 1, wherein the thickness of said inorganic insulating layer is 500 to 3000 Å.

11. A liquid crystal display device comprising a substrate provided with a thin film transistor array thereon, an inorganic insulating layer formed over said thin film transistor array, an organic insulating layer formed over said inorganic insulating layer and shading means for shading light to which said thin film transistor is sensitive, the surface part of said organic insulating layer in contact with liquid crystal having an orienting property.

12. A device according to claim 11, wherein the semiconductor layer constituting said thin film transistor is made of a material selected from the group consisting of at least Si, CdS, CdSe, CdTe and Te.

13. A device according to claim 11, wherein the semiconductor layer constituting said thin film transistor is made of an amorphous material.

14. A device according to claim 11, wherein the semiconductor layer constituting said thin film transistor is made of a microcrystalline material.

15. A device according to claim 11, wherein the semiconductor layer constituting said thin film transistor is made of a polycrystalline material.

16. A device according to claim 11, wherein the semiconductor layer constituting said thin film transistor is made of amorphous silicon and said amorphous silicon contains hydrogen atoms and/or halogen atoms.

17. A device according to claim 11, wherein the semiconductor layer constituting said thin film transistor is made of amorphous silicon and said amorphous silicon contains hydrogen atoms and/or halogen atoms in a total amount of 0.01 to 40 atomic %.

18. A device according to claim 11, wherein said organic insulating layer is formed using a material selected from the group consisting of a thermosetting resin, a thermoplastic resin and a synthetic rubber type resin.

19. A device according to claim 11, wherein the thickness of said organic insulating layer is 500 to 3000 Å.

20. A device according to claim 11, wherein the thickness of said inorganic insulating layer is 500 to 3000 Å.

21. A liquid crystal display device comprising a substrate provided with a thin film transistor array thereon, an inorganic insulating layer formed over said thin film transistor array, an organic insulating layer formed over said inorganic insulating layer, shading means for shading light to which said thin film transistor is sensitive and an orienting layer formed over at least the surface portion of said organic insulating layer situated at the display region.

22. A device according to claim 21, wherein the semiconductor layer constituting said thin film transistor is made of a material selected from the group consisting of at least Si, CdS, CdSe, CdTe and Te.

23. A device according to claim 21, wherein the semiconductor layer constituting said thin film transistor is made of an amorphous material.

24. A device according to claim 21, wherein the semiconductor layer constituting said thin film transistor is made of a microcrystalline material.

25. A device according to claim 21, wherein the semiconductor layer constituting said thin film transistor is made of a polycrystalline material.

26. A device according to claim 21, wherein the semiconductor layer constituting said thin film transistor is made of amorphous silicon and said amorphous silicon contains hydrogen atoms and/or halogen atoms.

27. A device according to claim 21, wherein the semiconductor layer constituting said thin film transistor is made of amorphous silicon and said amorphous silicon contains hydrogen atoms and/or halogen atoms in a total amount of 0.01 to 40 atomic %.

28. A device according to claim 21, wherein said organic insulating layer is formed using a material selected from the group consisting of a thermosetting resin, a thermoplastic resin and a synthetic rubber type resin.

29. A device according to claim 21, wherein the thickness of said organic insulating layer is 500 to 3000 Å.

30. A device according to claim 21, wherein the thickness of said inorganic insulating layer is 500 to 3000 Å.

* * * * *

UNITED STATES PATENT AND TRADEMARK OFFICE
CERTIFICATE OF CORRECTION

PATENT NO. : 4,636,038  Page 1 of 2
DATED : January 13, 1987
INVENTOR(S) : NOBUKO KITAHARA, ET AL.

It is certified that error appears in the above-identified patent and that said Letters Patent is hereby corrected as shown below:

COLUMN 1

Line 12, "havinga" should read --having a--.

COLUMN 2

Lines 12-13, "Tehrefore" should read --Therefore--.
    Line 26, "membr" should read --member--.
    Line 37, "invnetion" should read --invention--.
    Line 42, "Accordingly" should read --According--.
    Line 42, "invnetion," should read --invention,--.

COLUMN 3

Line 23, "contianed" should read --contained--.
    Line 50, "thermosettiing" should read --thermosetting--.
    Line 59, "rype" should read --type--.

COLUMN 4

Line 27, "metla" should read --metal--.
    Line 65, "invnetion" should read --invention--.
    Line 68, "invnetion" should read --invention--.

COLUMN 5

Line 4, "invnetion" should read --invention--.
    Line 28, "orgnaic" should read --organic--.
    Line 58, "haking" should read --baking--.

UNITED STATES PATENT AND TRADEMARK OFFICE
CERTIFICATE OF CORRECTION

PATENT NO. : 4,636,038
DATED : January 13, 1987
INVENTOR(S) : NOBUKO KITAHARA, ET AL.

It is certified that error appears in the above-identified patent and that said Letters Patent is hereby corrected as shown below:

COLUMN 6

Line 1, "temparature" should read --temperature--.
Line 16, "1.5m" should read --1.5µm--.
Line 49, "temparature" should read --temperature--.

COLUMN 7

Line 7, "temparature" should read --temperature--.
Line 32, "semiconcuctor" should read --semiconductor--.

Signed and Sealed this

Twenty-second Day of September, 1987

Attest:

DONALD J. QUIGG

Attesting Officer     Commissioner of Patents and Trademarks